United States Patent
Yamane et al.

(10) Patent No.: US 11,420,331 B2
(45) Date of Patent: Aug. 23, 2022

(54) MOTION RETARGETING CONTROL FOR HUMAN-ROBOT INTERACTION

(71) Applicant: Honda Motor Co., Ltd., Tokyo (JP)

(72) Inventors: Katsu Yamane, Mountain View, CA (US); Akshit Kaplish, Seattle, WA (US)

(73) Assignee: HONDA MOTOR CO., LTD., Tokyo (JP)

( * ) Notice: Subject to any disclaimer, the term of this patent is extended or adjusted under 35 U.S.C. 154(b) by 156 days.

(21) Appl. No.: 16/789,320

(22) Filed: Feb. 12, 2020

(65) Prior Publication Data

US 2021/0001490 A1   Jan. 7, 2021

Related U.S. Application Data (60) Provisional application No. 62/870,397, filed on Jul. 3, 2019.

(51) Int. Cl.
  *B25J 9/16*   (2006.01)
(52) U.S. Cl.
  CPC ............ *B25J 9/1689* (2013.01); *B25J 9/1697* (2013.01)
(58) Field of Classification Search
  CPC .............................. B25J 9/1697; B25J 9/1689
  See application file for complete search history.

(56) References Cited

U.S. PATENT DOCUMENTS

| | | | | |
|---|---|---|---|---|
| 5,694,013 | A * | 12/1997 | Stewart | B25J 9/1656 318/561 |
| 6,104,379 | A * | 8/2000 | Petrich | G06F 3/014 345/156 |
| 8,108,190 | B2 * | 1/2012 | Riener | G09B 23/32 703/11 |
| 10,828,769 | B2 * | 11/2020 | Meissner | G05B 19/423 |
| 10,852,874 | B2 * | 12/2020 | Yoshida | G01L 5/16 |
| 2009/0259412 | A1 * | 10/2009 | Brogardh | B25J 9/1633 702/41 |
| 2010/0302253 | A1 * | 12/2010 | Kipman | G06T 13/40 345/473 |
| 2018/0284760 | A1 * | 10/2018 | Gupta | B25J 13/006 |

(Continued)

OTHER PUBLICATIONS

R. J. Anderson and M. W. Spong, "Bilateral control of teleoperators with time delay," IEEE Transactions on Automatic control, vol. 34, No. 5, pp. 494-501, 1989.

(Continued)

*Primary Examiner* — Nicholas Kiswanto
(74) *Attorney, Agent, or Firm* — Rankin, Hill & Clark LLP (57) ABSTRACT

Controlling a robot may be performed by calculating a desired velocity based on an operator contact force and a robot contact force, calculating a transformation matrix based on an operator pose, a robot pose, a robot trajectory, the operator contact force, and the robot contact force, calculating a least square solution to $J_f^+ \hat{v}_f$ based on the desired velocity, calculating a scaling factor based on a current joint position of a joint of the robot, calculating a first trajectory based on the least square solution, the scaling factor, and the transformation matrix, calculating the robot trajectory, calculating a joint command based on the robot trajectory and the robot pose, and implementing the joint command.

18 Claims, 5 Drawing Sheets

(56) References Cited

U.S. PATENT DOCUMENTS

| | | | |
|---|---|---|---|
| 2019/0358817 A1* | 11/2019 | Ghazaei Ardakani | ............... B25J 13/085 |
| 2020/0101604 A1* | 4/2020 | Lutscher | ............... B25J 9/1676 |
| 2020/0101610 A1* | 4/2020 | Thackston | ............ B25J 9/1612 |
| 2021/0069894 A1* | 3/2021 | Rod | ............... G02B 27/0179 |
| 2021/0078178 A1* | 3/2021 | Yamane | ............... B25J 19/02 |
| 2021/0183359 A1* | 6/2021 | Hayashi | ............... G10L 15/22 |

OTHER PUBLICATIONS

A. E. Block and K. J. Kuchenbecker, "Emotionally supporting humans through robot hugs," in Companion of the 2018 ACM/IEEE International Conference on Human-Robot Interaction. ACM, 2018, pp. 293-294.

N. Chopra, M. W. Spong, R. Ortega, and N. E. Barabanov, "On tracking performance in bilateral teleoperation," IEEE Transactions on Robotics, vol. 22, No. 4, pp. 861-866, 2006.

N. Hogan, "Impedance control: An approach to manipulation," in 1984 American control conference. IEEE, 1984, pp. 304-313.

S. G. Johnson, "The NLopt nonlinear-optimization package," http://github.com/stevengj/nlopt.

A. Q. Keemink, H. van der Kooij, and A. H. Stienen, "Admittance control for physical human-robot interaction," The International Journal of Robotics Research, vol. 37, No. 11, pp. 1421-1444, 2018.

O. Khatib and J. Burdick, "Motion and force control of robot manipulators," in Proceedings. 1986 IEEE International Conference on Robotics and Automation, vol. 3. IEEE, 1986, pp. 1381-1386.

M. L. Knapp, J. A. Hall, and T. G. Horgan, Nonverbal communication in human interaction. Cengage Learning, 2013.

N. Mansard, O. Khatib, and A. Kheddar, "A unified approach to integrate unilateral constraints in the stack of tasks," IEEE Transactions on Robotics, vol. 25, No. 3, pp. 670-685, 2009.

J. Peters, M. Mistry, F. Udwadia, J. Nakanishi, and S. Schaal, "A unifying framework for robot control with redundant dofs," Autonomous Robots, vol. 24, No. 1, pp. 1-12, 2008.

M. Shiomi, A. Nakata, M. Kanbara, and N. Hagita, "A robot that encourages self-disclosure by hug," in International Conference on Social Robotics. Springer, 2017, pp. 324-333.

D. E. Whitney, "Force feedback control of manipulator fine motions," Journal of Dynamic Systems, Measurement, and Control, vol. 99, No. 2, pp. 91-97, 1977.

T. Yoshikawa, T. Sugie, and M. Tanaka, "Dynamic hybrid position/force control of robot manipulators-controller design and experiment," IEEE Journal on Robotics and Automation, vol. 4, No. 6, pp. 699-705, 1988.

International Search Report and Written Opinion of PCT/US2020/039786 dated Sep. 3, 2020, 25 pages.

J. Y. Chen, E. C. Haas, and M. J. Barnes, "Human performance issues and user interface design for teleoperated robots," IEEE Transactions on Systems, Man, and Cybernetics, Part C (Applications and Reviews), vol. 37, No. 6, pp. 1231-1245, 2007.

A. Cherubini, R. Passama, A. Crosnier, A. Lasnier, and P. Fraisse, "Collaborative manufacturing with physical human-robot interaction," Robotics and Computer-Integrated Manufacturing, vol. 40, pp. 1-13, 2016.

V. G. Chouvardas, A. N. Miliou, and M. K. Hatalis, "Tactile displays: Overview and recent advances," Displays, vol. 29, No. 3, pp. 185-194, 2008.

A. De Santis, B. Siciliano, A. De Luca, and A. Bicchi, "An atlas of physical human-robot interaction," Mechanism and Machine Theory, vol. 43, No. 3, pp. 253-270, 2008.

S. Haddadin, A. Albu-Schaffer, A. De Luca, and G. Hirzinger, "Collision detection and reaction: A contribution to safe physical human-robot interaction," in 2008 IEEE/RSJ International Conference on Intelligent Robots and Systems. IEEE, 2008, pp. 3356-3363.

O. Khatib, L. Sentis, J. Park, and J. Warren, "Whole-body dynamic behavior and control of human-like robots," International Journal of Humanoid Robotics, vol. 1, No. 01, pp. 29-43, 2004.

D. Lee and M. W. Spong, "Passive bilateral teleoperation with constant time delay," IEEE transactions on robotics, vol. 22, No. 2, pp. 269-281, 2006.

I. Rae, L. Takayama, and B. Mutlu, "In-body experiences: embodiment, control, and trust in robot-mediated communication," in Proceedings of the SIGCHI Conference on Human Factors in Computing Systems. ACM, 2013, pp. 1921-1930.

M. H. Raibert, J. J. Craig et al., "Hybrid position/force control of manipulators," Journal of Dynamic Systems, Measurement, and Control, vol. 103, No. 2, pp. 126-133, 1981.

L. Sentis and O. Khatib, "Synthesis of whole-body behaviors through hierarchical control of behavioral primitives," International Journal of Humanoid Robotics, vol. 2, No. 04, pp. 505-518, 2005.

G. Tonietti, R. Schiavi, and A. Bicchi, "Design and control of a variable stiffness actuator for safe and fast physical human/robot interaction," in Proceedings of the 2005 IEEE international conference on robotics and automation. IEEE, 2005, pp. 526-531.

K. Wada, T. Shibata, T. Saito, and K. Tanie, "Effects of robot-assisted activity for elderly people and nurses at a day service center," Proceedings of the IEEE, vol. 92, No. 11, pp. 1780-1788, 2004.

Clearpath Robotics, "Ridgeback omnidirectional platform," https://clearpathrobotics.com/ridgeback-indoor-robot-platform/.

Franka Emika GmbH, "Introducing the Franka Emika robot," https://www.franka.de/.

Inertiallabs, "Miniature and subminiature orientation sensors," https://inertiallabs.com/3os.html.

PARO Robotics, "Paro therapeutic robot," http://www.parorobots.com/.

Touchence Inc., "ShokacPot/ShokacCube product outline," http://www.touchence.jp/en/cube/index.html.

Wikipedia, "Axes conventions," https://en.wikipedia.org/wiki/Axes conventions.

P. F. Hokayem and M. W. Spong, "Bilateral teleoperation: An historical survey," Automatica, vol. 42, No. 12, pp. 2035-2057, 2006.

Y. Nakamura, "Advanced robotics: Redundancy and optimization (addison-wesley series in electrical and computer engineering)," 1991.

* cited by examiner

MOTION RETARGETING CONTROL FOR HUMAN-ROBOT INTERACTION

CROSS-REFERENCE TO RELATED APPLICATIONS

This application claims the benefit of U.S. Provisional Patent Application, Ser. No. 62/870,397 entitled MOTION RETARGETING CONTROL FOR HUMAN-ROBOT INTERACTION, filed on Jul. 3, 2019; the entirety of the above-noted application(s) is incorporated by reference herein.

BACKGROUND

Vision and audio are currently the main modalities for communication between people in remote locations. In-person communication, by contrast, often involves direct physical contact, such as rubbing, hand-shaking and hugging, which play an important role in communicating personality and emotion. While mobile telepresence robots can enhance interpersonal trust in remote communication through their physical presence, existing systems are not designed to perform efficient direct physical interaction with humans.

BRIEF DESCRIPTION

According to one aspect, a system for controlling a robot may include an admittance controller, a retargeting controller, a force optimization controller, a motion optimization controller, a tracking controller, and a motor controller. The admittance controller may receive an operator contact force $f_h$ and a robot contact force $f_r$ and calculate a desired velocity $v_f$ based on the operator contact force $f_h$ and the robot contact force $f_r$. The retargeting controller may receive an operator pose $R_k$, a robot pose q, a robot trajectory $q^*$, the operator contact force $f_h$, and the robot contact force $f_r$ and calculate a transformation matrix $T_j$ which maps a human contact state to a robot contact state based on the operator pose $R_k$, the robot pose q, the robot trajectory $q^*$, the operator contact force $f_h$, and the robot contact force $f_r$. The force optimization controller may receive the desired velocity $v_f$ and calculate a least square solution $q_f$ to $J_f^+ \hat{v}_f$ based on the desired velocity $v_f$. $J_f^+$ may be a Moore-Penrose pseudoinverse of $J_f$. $J_f$ may be a Jacobian matrix of positions of contact points with respect to joint positions. The force optimization controller may calculate a scaling factor $s_f$ based on a current joint position $q_j$ of a joint of the robot. The motion optimization controller may receive the least square solution $q_f$, the scaling factor $s_f$, and the transformation matrix $T_j$ and calculate a first trajectory $\dot{q}^*$ based on the least square solution $q_f$, the scaling factor $s_f$, and the transformation matrix $T_j$. The tracking controller may receive the first trajectory $\dot{q}^*$ and the robot pose q, calculate the robot trajectory $q^*$ based on the first trajectory $\dot{q}^*$, and calculate a joint command τ based on the robot trajectory $q^*$ and the robot pose q. The motor controller may implement the joint command τ at the joint of the robot.

The operator contact force $f_h$ may be measured by a force sensor attached to an operator of the robot. The system may include a force sensor attached to the robot measuring the robot contact force $f_r$. The admittance controller may calculate the desired velocity $v_f$ based on admittance control. The motion optimization controller may relax the least square solution $q_f$ based on the scaling factor $s_f$. The motion optimization controller may relax the least square solution $q_f$ based on minimizing tangential motion. The retargeting controller may calculate the transformation matrix $T_j$ based on motion reference offset. The motion optimization controller may calculate the first trajectory $\dot{q}^*$ based on an inequality constraint associated with a position of a force sensor. The joint command τ may include a joint torque for the joint of the robot. The tracking controller may include a proportional-derivative (PD) controller and may calculate the joint command τ based on gravity compensation.

According to one aspect, a method for controlling a robot may include calculating a desired velocity $v_f$ based on an operator contact force $f_h$ and a robot contact force $f_r$, calculating a transformation matrix $T_j$ which maps a human contact state to a robot contact state based on an operator pose $R_k$, a robot pose q, a robot trajectory $q^*$, the operator contact force $f_h$, and the robot contact force $f_r$, and calculating a least square solution $q_f$ to $J_f^+ \hat{v}_f$ based on the desired velocity $v_f$. $J_f^+$ may be a Moore-Penrose pseudoinverse of $J_f$. $J_f$ may be a Jacobian matrix of positions of contact points with respect to joint positions. The method for controlling the robot may include calculating a scaling factor $s_f$ based on a current joint position $q_j$ of a joint of the robot, calculating a first trajectory $\dot{q}^*$ based on the least square solution $q_f$, the scaling factor $s_f$, and the transformation matrix $T_j$, calculating the robot trajectory $q^*$ based on the first trajectory $\dot{q}^*$, calculating a joint command τ based on the robot trajectory $q^*$ and the robot pose q, and implementing the joint command τ at the joint of the robot.

The operator contact force $f_h$ may be measured by a force sensor attached to an operator of the robot. The robot contact force $f_r$ may be measured by a force sensor attached to the robot. The method for controlling a robot may include calculating the desired velocity $v_f$ based on admittance control, relaxing the least square solution $q_f$ based on the scaling factor $s_f$, relaxing the least square solution $q_f$ based on minimizing tangential motion, calculating the transformation matrix $T_j$ based on motion reference offset, calculating the first trajectory $\dot{q}^*$ based on an inequality constraint associated with a position of a force sensor, and calculating the joint command τ based on gravity compensation.

According to one aspect, a system for controlling a robot may include a force sensor, an admittance controller, a retargeting controller, a force optimization controller, a motion optimization controller, a tracking controller, and a motor controller. The force sensor may be attached to the robot and may measure a robot contact force $f_r$. The admittance controller may receive an operator contact force $f_h$ and the robot contact force $f_r$ and calculate a desired velocity $v_f$ based on the operator contact force $f_h$ and the robot contact force $f_r$. The retargeting controller may receive an operator pose $R_k$, a robot pose q, a robot trajectory $q^*$, the operator contact force $f_h$, and the robot contact force $f_r$ and calculate a transformation matrix $T_j$ which maps a human contact state to a robot contact state based on the operator pose $R_k$, the robot pose q, the robot trajectory $q^*$, the operator contact force $f_h$, and the robot contact force $f_r$. The force optimization controller may receive the desired velocity $v_f$ and calculate a least square solution $q_f$ to $J_f^+ \hat{v}_f$ based on the desired velocity $v_f$. $J_f^+$ may be a Moore-Penrose pseudoinverse of $J_f$. $J_f$ may be a Jacobian matrix of positions of contact points with respect to joint positions. The force optimization controller may calculate a scaling factor $s_f$ based on a current joint position $q_j$ of a joint of the robot. The motion optimization controller may receive the least square solution $q_f$, the scaling factor $s_f$, and the transformation matrix $T_j$ and calculate a first trajectory $\dot{q}^*$ based on the least square solution $q_f$, the scaling factor $s_f$, and the transformation matrix $T_j$. The tracking controller may receive the first trajectory $\dot{q}^*$ and the robot pose q, calculate the robot trajectory q* based on the first trajectory $\dot{q}^*$, and calculate a joint command τ based on the robot trajectory q* and the robot pose q. The motor controller may implement the joint command τ at the joint of the robot.

BRIEF DESCRIPTION OF THE DRAWINGS

FIG. 2a-2b is an exemplary relaxation performed in association with motion optimization of the system for controlling the robot of FIG. 1, according to one aspect.

DETAILED DESCRIPTION

The following includes definitions of selected terms employed herein. The definitions include various examples and/or forms of components that fall within the scope of a term and that may be used for implementation. The examples are not intended to be limiting. Further, one having ordinary skill in the art will appreciate that the components discussed herein, may be combined, omitted or organized with other components or organized into different architectures.

A "processor", as used herein, processes signals and performs general computing and arithmetic functions. Signals processed by the processor may include digital signals, data signals, computer instructions, processor instructions, messages, a bit, a bit stream, or other means that may be received, transmitted, and/or detected. Generally, the processor may be a variety of various processors including multiple single and multicore processors and co-processors and other multiple single and multicore processor and co-processor architectures. The processor may include various modules to execute various functions.

A "memory", as used herein, may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

A "disk" or "drive", as used herein, may be a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD-ROM). The disk may store an operating system that controls or allocates resources of a computing device.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), among others.

A "database", as used herein, may refer to a table, a set of tables, and a set of data stores (e.g., disks) and/or methods for accessing and/or manipulating those data stores.

An "operable connection", or a connection by which entities are "operably connected", is one in which signals, physical communications, and/or logical communications may be sent and/or received. An operable connection may include a wireless interface, a physical interface, a data interface, and/or an electrical interface.

A "computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "mobile device", as used herein, may be a computing device typically having a display screen with a user input (e.g., touch, keyboard) and a processor for computing. Mobile devices include handheld devices, portable electronic devices, smart phones, laptops, tablets, and e-readers.

A "vehicle", as used herein, refers to any moving vehicle that is capable of carrying one or more human occupants and is powered by any form of energy. The term "vehicle" includes cars, trucks, vans, minivans, SUVs, motorcycles, scooters, boats, personal watercraft, and aircraft. In some scenarios, a motor vehicle includes one or more engines. Further, the term "vehicle" may refer to an electric vehicle (EV) that is powered entirely or partially by one or more electric motors powered by an electric battery. The EV may include battery electric vehicles (BEV) and plug-in hybrid electric vehicles (PHEV). Additionally, the term "vehicle" may refer to an autonomous vehicle and/or self-driving vehicle powered by any form of energy. The autonomous vehicle may or may not carry one or more human occupants.

A "vehicle system", as used herein, may be any automatic or manual systems that may be used to enhance the vehicle, driving, and/or safety. Exemplary vehicle systems include a motor system, an autonomous driving system, an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, among others.

The aspects discussed herein may be described and implemented in the context of non-transitory computer-readable storage medium storing computer-executable instructions. Non-transitory computer-readable storage media include computer storage media and communication media. For example, flash memory drives, digital versatile discs (DVDs), compact discs (CDs), floppy disks, and tape cassettes. Non-transitory computer-readable storage media may include volatile and non-volatile, removable and non-removable media implemented in any method or technology for storage of information such as computer readable instructions, data structures, modules, or other data.

Figure 1:
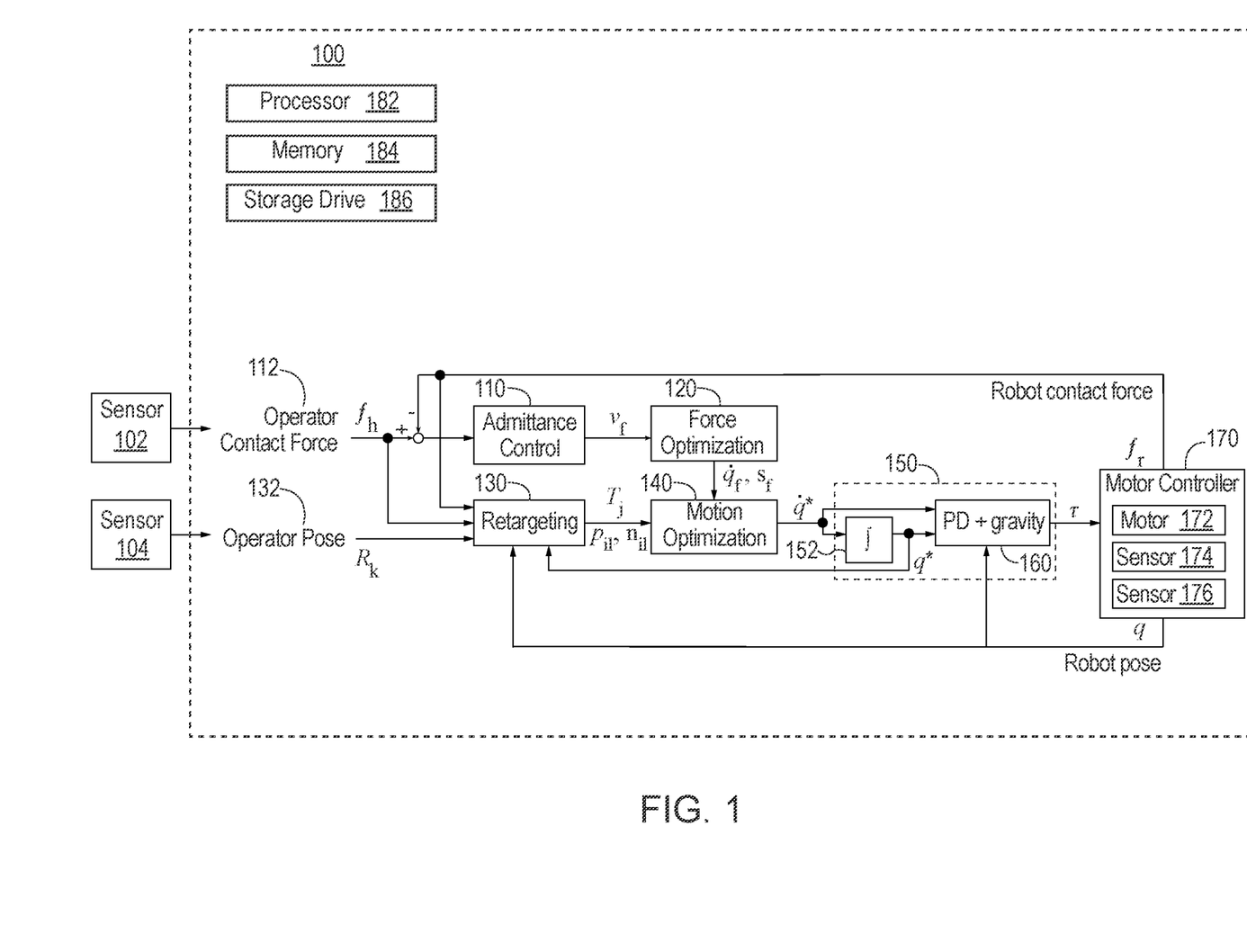
FIG. 1 is an exemplary component diagram of a system for controlling a robot, according to one aspect.

FIG. 1 is an exemplary component diagram of a system for controlling a robot, according to one aspect. The system for controlling the robot may receive inputs from sensors 102, 104 worn by an operator. According to one aspect, the system for controlling the robot may include an admittance controller 110, a force optimization controller 120, a retargeting controller 130, a motion optimization controller 140, a tracking controller 150, a motor controller, a processor 182, a memory 184, and a storage drive 186. The tracking controller 150 may include an integrator 152 and a proportional-derivative (PD) controller 160. The PD controller 160 may calculate the joint command $\tau$ based on gravity compensation.

The motor controller may operate a motor 172 equipped with sensors 174, 176. The motor 172 may be an actuator, which may include a joint. According to one aspect, the sensor 102 may measure an operator contact force $f_h$ 112, the sensor 104 may measure an operator pose $R_k$ 132 (e.g., the pose of the operator, operator arms, etc.), the sensor 174 may measure a robot contact force $f_r$, and the sensor 176 may measure a robot pose q. The sensor 102 and the sensor 174 may be force sensors. In this way, the operator contact force $f_h$ may be measured by the force sensor 102 attached to an operator of the robot and the force sensor and the force sensor 174 attached to the robot may measure the robot contact force $f_r$.

The operator may have an object in front of him or her and the robot may have a corresponding object located similarly. In other words, there may be an object on the operator side environment that the operator may touch. On the robot side environment, there may be another object (e.g., which may be a human or may be an inanimate object) that the robot may come in contact with or touch, corresponding to the operator side environment. In teleoperation, the motion and force commands may be given by the operator. Due to differences between the bodies of the operator and robot, the command motion and force may or may not be feasible on the robot (e.g., operator size and shape, robot size and shape, mechanical limits of the robot, etc.).

According to one aspect, teleoperation may occur where the sensor equipped operator may interact with a static object, such as a mannequin to provide an input motion and force references. One or more of the controllers described herein may receive the reference motion, reference force, a current robot state (e.g., pose), contact forces, etc. as inputs and output joint torques corresponding to the operator's contact forces, while preserving expression and style of the operator's motion. This may be achieved via motion retargeting, force optimization, and motion optimization.

Any of the controllers 110, 120, 130, 140, 150, 170, etc. may be implemented as an integrated circuit, an external device, a separate device from the other controllers, and may each include a processor, memory, storage drive, bus, etc. or be implemented via the processor 182, the memory 184, and the storage drive 186.

The admittance controller 110 may receive the operator contact force $f_h$ and the robot contact force $f_r$ and may calculate a desired velocity $v_f$ based on the operator contact force $f_h$ and the robot contact force $f_r$. The admittance controller 110 may calculate the desired velocity $v_f$ based on admittance control. The desired velocity $v_f$ may be a velocity of a contact point to be generated in order to realize the same contact force as the operator side.

The retargeting controller 130 may receive the operator pose $R_k$, the robot pose q, a robot trajectory q*, the operator contact force $f_h$, and the robot contact force $f_r$ and may calculate a transformation matrix $T_j$ which maps a human contact state to a robot contact state based on the operator pose $R_k$, the robot pose q, the robot trajectory q*, the operator contact force $f_h$, and the robot contact force $f_r$. The retargeting controller 130 may calculate the transformation matrix $T_j$ based on motion reference offset. While motion optimization attempts to realize the operator's pose, different contact states may occur on the operator side and on the robot side environments.

For example, if the operator is touching an object on the operator side environment, but the robot is not touching a corresponding object, then the robot may be retargeted by the retargeting controller 130 to move one or more robot arms closer together in order to touch the corresponding object in front of the robot on the robot side environment because taking the same or an identical pose as the operator may not result in the same kinematic relationship between the corresponding object at the robot side environment as on the operator side environment. In this way, the retargeting controller 130 may calculate or compute an adjusted robot pose based on the transformation matrix $T_j$, thereby resulting in identical contact states between the robot and the operator. This transformation matrix $T_j$ may be determined based on an operator body size, a robot body size, a size of the object, a size of the corresponding object, a length of a limb of the operator, a length of a limb of the robot, a shape of the body of the operator, a shape of the body of the robot, mechanical limits associated with the robot, etc. The retargeting controller 130 may implement or execute a finite state machine (FSM), as discussed with reference to FIG. 3 below.

In this way, the retargeting controller 130 may resolve any discrepancies between the contact states of the operator and the robot (e.g., which may include a robot arm, motor or actuator, joint, etc.), including those associated with different kinematic parameters and body shapes.

According to one aspect, the force optimization controller 120 may realize the operator contact force $f_h$ measured by the sensor 102. According to one aspect, force control may be prioritized over motion tracking because matching the force profile may create a more realistic physical interaction.

The force optimization controller 120 may receive the desired velocity $v_f$ and may calculate a least square solution $q_f$ to $J_f^+ \hat{v}_f$ based on the desired velocity $v_f$. $J_f^+$ may be a Moore-Penrose pseudoinverse of $J_f$. $J_f$ is a Jacobian matrix of positions of contact points with respect to joint positions.

The force optimization controller 120 may calculate a scaling factor $s_f$ based on a current joint position $q_j$ of a joint of the robot.

The motion optimization controller 140 may receive the least square solution $q_f$, the scaling factor $s_f$, and the transformation matrix $T_j$ and may calculate a first trajectory $\dot{q}$* based on the least square solution $q_f$, the scaling factor $s_f$, and the transformation matrix $T_j$. This trajectory $\dot{q}^*$ may be associated with a joint velocity that realizes the force command but also comes as close as possible to the operator pose (e.g., realizing the operator pose). The motion optimization controller 140 may relax the least square solution $q_f$ based on the scaling factor $s_f$. In this way, the motion optimization controller 140 may relax the least square solution $q_f$ based on minimizing tangential motion, as will be described in greater detail with reference to FIG. 2.

According to one aspect, the motion optimization controller 140 may calculate the first trajectory $\dot{q}^*$ based on an inequality constraint associated with a position of a force sensor. Specifically, the motion optimization controller 140 and the force optimization controller 120 may generate the joint command $\tau$ to reproduce the contact force and motion of the operator to the greatest extent possible.

The tracking controller 150 may receive the first trajectory $\dot{q}^*$ and the robot pose q, calculate the robot trajectory $q^*$ based on the first trajectory $\dot{q}^*$, and calculate a joint command $\tau$ based on the robot trajectory $q^*$ and the robot pose q. The robot trajectory $q^*$ may be fed back to the retargeting controller 130.

The motor controller may implement the joint command $\tau$ at the joint of the robot. The joint command $\tau$ may include a joint torque for the joint of the robot. The joint of the robot may include an actuator, a flotational joint, a hydraulic cylinder, other joint, etc. As seen in FIG. 1, the robot contact force $f_r$ measured by the force sensor 174 may be fed back to the admittance controller 110 and the retargeting controller 130. The robot pose q measured by the sensor 176 may be fed back to the tracking controller 150 and/or the PD controller 160 and the retargeting controller 130.

As previously discussed, the inputs to the system for controlling the robot may include:

$f_h \in R^M$: contact forces measured by M force sensors attached to the operator;

$f_r \in R^M$: contact forces measured by the force sensors attached to the robot;

$^E R_k$ (k=1, 2, . . . , K): orientations of the K IMUs (IMU, as used herein, may be a sensor, such as sensor 102, 104, etc.) attached to the operator, represented in an East-North-Up (ENU) frame; and $q \in R^N$: joint positions of the robot where N is the degrees of freedom (DoF) of the robot.

The output of the system for controlling the robot may include the robot's joint torque command $\tau \in R^N$.

Each of the M force sensors attached to the operator may be associated with a set of force sensors on the robot placed at topologically similar locations. If the set contains multiple force sensors, the sum of the measurements of those sensors may be used in $f_r$. As a result, fh and $f_r$ have the same number of elements that are ordered such that corresponding sensors have the same index in the respective vectors. A pair of corresponding force sensors on the operator and robot may be referred to as a force sensor pair.

The tracking controller 150 may calculate the joint torques T to track the optimized joint positions $q^* \in R^N$ and velocities $\dot{q}^* \in R^N$ by the PD controller 160 and gravity compensation according to:

$$\tau = K_p(q^*-q) + D_d(\dot{q}^*-\dot{q}) + g(q) \qquad (1)$$

where $K_p \in R^{N \times N}$ and $K_d \in R^{N \times N}$ may be user-specified, positive-definite gain matrices and g(q) may give the gravity compensation torque at q.

One goal of force optimization may be to match $f_r$ to $f_h$. $m(\leq M)$ may denote the number of force sensor pairs of which at least one is in contact, and ci may denote the index of i-th force sensor pair. The desired velocity $v_f$ of the force sensor $c_i$ may be calculated along its normal vector by admittance control:

$$\hat{v}_{fc_i} = k_f(f_{hc_i} - f_{rc_i}), (i=1,2, \ldots, m) \qquad (2)$$

where $k_f (>0)$ may be a user-defined constant gain. With this velocity, the robot may push the contact surface when a human force sensor measurement is larger than that of the corresponding robot force sensor.

In general, the velocity of a force sensor along its normal vector may be computed from the joint velocities as:

$$v_{fk} = n_k^T J_{Pk} \dot{q}, (k=1,2, \ldots, M) \qquad (3)$$

where $J_{Pk} \in R^{3 \times N}$ is the Jacobian matrix of the position of the k-th force sensor with respect to the joint positions, and $n_k \in R^3$ is the normal vector.

According to one aspect, computing the joint velocities that realize the desired force sensor velocity may be achieved by solving a constrained optimization problem:

$$\dot{q}_f = \underset{\dot{q}}{argmin}(\hat{v}_f - J_f \dot{q})^T T (\hat{v}_f - J_f \dot{q}) \qquad (4)$$

subject to:

$$\underline{\dot{q}} \leq \dot{q} \leq \overline{\dot{q}} \qquad (5)$$

where $$\hat{v}_f = (\hat{v}_{fc_1} \hat{v}_{fc_2} \ldots \hat{v}_{fc_m})^T \in R^m \qquad (6)$$

$$J_f = \begin{pmatrix} n_{c_1}^T J_{Pc_1} \\ \vdots \\ n_{c_m}^T J_{Pc_m} \end{pmatrix} \in R^{m \times N} \qquad (7)$$

The lower and upper bounds in Eq. (5) may be determined for joint j (j=1, 2, . . . , N) as follows:

$$\underline{\dot{q}}_j = \max\{-\dot{q}_{maxj}, (q_{minj} - q_j)/\Delta t\} \qquad (8)$$

$$\overline{\dot{q}}_j = \min\{\dot{q}_{maxj}, (q_{maxj} - q_j)/\Delta t\} \qquad (9)$$

where $q_j$ may be the current joint position, $q_{minj}$ and $q_{maxj}$ are the minimum and maximum joint positions respectively, $\dot{q}_{maxj} (>0)$ may be the mechanical joint velocity limit, and it is the controller cycle time.

The calculation for the least-square solution may be:

$$\dot{q}_f^0 = J_f^+ \hat{v}_f \qquad (10)$$

where $J_f^+$ is the Moore-Penrose pesudoinverse of $J_f$. The maximum scaling factor $sf(\leq 1)$ such that $\dot{q}_f = s_f \dot{q}_f^0$ of satisfies Eq. (5) may be computed. The scaling factor may be computed by:

$$s_f = \underset{j \in [1,N]}{\min} \max\left\{\min\left(1, \frac{\underline{\dot{q}}_j}{\dot{q}_{fj}^0}\right), \min\left(1, \frac{\overline{\dot{q}}_j}{\dot{q}_{fj}^0}\right)\right\} \qquad (11)$$

where $\dot{q}_{fj}^0$ is the j-th element of $\dot{q}_f^0$. $s_f \geq 0$ as long as all joint positions are within their ranges. If $s_f=0$, moving the sensor toward the direction in accordance with admittance control may not be feasible without incurring tangential movement.

In this way, motion retargeting and robot control for teleoperated physical human-robot interaction (pHRI) may be provided.

With respect to motion optimization, the motion optimization controller 140 may compute the desired link angular velocities $\hat{\omega}_m$ from the operator's limb orientations measured by IMUs or sensors. The k-th IMU or sensor may be attached to the frame of joint j(k). The reference orientation for joint j(k), $^0\hat{R}_{j(k)}$, may be computed by:

$$^0\hat{R}_{j(k)} = {}^0R_E\,{}^ER_k\,{}^kR_{j(k)} \tag{12}$$

where $^0R_E$ may be the orientation of the ENU frame represented in the world frame in which the robot model is defined and $^kR_{j(k)}$ may be the relative orientation between the IMU or sensor and joint frames. $^kR_{j(k)}$ may be constant throughout the motion and its value offline may be determined by obtaining IMU or sensor measurements when the robot and operator take the same pose. The desired velocity for link j(k), $\hat{\omega}_{mj(k)} \in R^3$, may be computed by:

$$\hat{\omega}_{mj(k)} = k_m s)(^0R_{j(k)}, {}^0\hat{R}_{j(k)}) \tag{13}$$

where $k_m$ may be a user-defined constant gain, $^0R_{j(k)}$ may be the current orientation, and $s(R_1, R_2)$ may be a function that computes $\alpha \sin \theta$ where $(\alpha, \theta)$ represents the equivalent angle-axis representation of the rotation from $R_1$ to $R_2$. $\hat{\omega}_{mj(k)}$ (k=1, 2, ..., K) may be concatenated to obtain the desired link velocity vector $\hat{\omega}_m \in R^{3K}$. Additionally, the Jacobian matrix $J_m \in R^{3K \times N}$ may be obtained by concatenating the Jacobian matrix of the orientation of every joint with respect to the joint positions.

Motion optimization may be considered as:

$$\dot{q}^* = \underset{\dot{q}}{argmin}\{(\hat{\omega}_m - J_m\dot{q})^T(\hat{\omega}_m - J_m\dot{q}) + w_q\dot{q}^T\dot{q}\} \tag{14}$$

subject to Eq. (5) and $$\underline{v}_f J_f \dot{q} \leq \overline{v}_f \tag{15}$$

where $w_q$ may be a user-defined weight for the regularization term. The optimal joint positions q* may be calculated by the integrator 152 by numerically integrating $\dot{q}^*$.

Defining $\hat{v}_{fi}$ as the i-th element of $\hat{v}_f$, the upper and lower bounds in Eq. (15) are determined as:

$$\overline{v}_{fi} = \max\{s_f \hat{v}_{fi}, \hat{v}_{fi}\} \tag{16}$$

$$\underline{v}_{fi} = \min\{s_f \hat{v}_{fi}, \hat{v}_{fi}\} \tag{17}$$

if at least the operator sensor of pair i is in contact, and $$\overline{v}_{fi} = s_f \hat{v}_{fi} \tag{18}$$

$$\underline{v}_{fi} = -\infty \tag{19}$$

If only the robot is in contact, Eq. (19) may be utilized because the robot should move away from the human if the operator motion is in the same direction. If only the operator sensor is in contact, on the other hand, the robot should avoid contacting the human too hard.

The bounds of Eq. (16) and Eq. (17) relax the force control requirement by allowing the motion optimization controller 140 to select a solution from an area rather than along a line segment. This relaxation enables selection of a solution that does not incur tangential movement, if desired. At the same time, the motion optimization controller 140 may determine a solution that satisfies Eq. (3) within joint velocity limits.

With respect to the motion retargeting controller 130, there are generally four possible contact state combinations for each force sensor pair:

contact state 1) both are not in contact
contact state 2) only the operator side is in contact with the object
contact state 3) only the robot side is in contact with corresponding object
contact state 4) both are in contact with their respective objects The motion retargeting controller 130 may resolve the contact state discrepancy in the cases of contact state 2) and contact state 3), and to mitigate the robot from encountering contact state 2) and contact state 3). The controller may merely use contact force information already available for force control, although vision or depth information may be utilized to estimate the shape of the interaction target. However, in intimate interactions, potential contact locations, such as the person's back are often not visible from onboard cameras or depth sensors, and thus, the calculations of the motion retargeting controller 130 may be primarily based on merely contact force and/or pose information, as previously discussed.

Eq. (3) may work towards resolving the contact state discrepancy. In contact state 2), the robot moves the force sensor (which is not in contact) towards the human because $f_{hc_i} > f_{rc_i} = 0$, while in contact state 3) the robot moves away from the human because $f_{rc_i} > f_{hc_i} = 0$. However, the robot cannot make contact instantly in contact state 2), and the robot may continually alternate between non-contact and contact states in 3) if motion optimization drives the robot toward the human, which is likely because the operator has not made a contact yet. In this regard, motion reference offset and an additional inequality constraint may be applied during motion optimization by the motion optimization controller 140.

Motion reference offset is aimed at tweaking the reference joint orientations obtained from IMU measurements such that the robot is more likely to realize the same contact state as the operator in the future. One transformation matrix may be stored for each IMU (e.g., sensor) and update all matrices of the IMUs in the same limb as the force sensor pair that transitioned from contact state 2) to contact state 4). $^0\hat{R}_{j2}$ may denote the reference orientation of joint j when a force sensor on the operator side made a contact. In contact state 2), the corresponding force sensor on the robot has not touched the human at this point. Due to the controller prioritizing force over motion, the robot will gradually move toward the human. Assuming that the operator maintains the contact with the mannequin, the robot will eventually come to contact and enter contact state 4). $^0R^*_{j4}$ may denote the orientation of the joint j frame computed using the current optimal joint positions q*. A coordinate transformation that maps $^0\hat{R}_{j2}$ to $^0R^*_{j4}$ may be desired in order to realize the same contact state when the human initially made the contact, the transformation matrices are updated as:

$$^0T_j = {}^0R^*_{j4}\,{}^0\hat{R}_{j2}^T \tag{20}$$

which may be used to modify the reference orientation in Eq. (12) as:

$$^0\hat{R}'_j = {}^0\hat{R}_j \tag{21}$$

An additional inequality constraint may be added to the motion optimization formulation when a force sensor pair transitions from contact state 3) to contact state 1) in order to mitigate scenarios where the robot from makes undesired contact. If the robot makes a contact when the operator has not, the controller pulls the robot away from the human and transitions to contact state 1). $p_{i1}$ and $n_{i1}$ may denote the position and normal vector, respectively, of the force sensor at contact state 1). The new inequality constraint used in addition to Eqs. (5) and (15) may be:

$$n_{i1}^T J_{Pi} \dot{q} \le \frac{1}{\Delta t} n_{i1}^T (p_{i1} - p_i) \qquad (22)$$

where $p_i$ may be the current position of the sensor. This constraint enables a "wall" to be created which the sensor should not pass through in order not to touch the human. Because the human's body has curves, this constraint may be local to the particular contact point. Thus, the constraint may be removed once the corresponding sensor on either side makes a new contact.

Figure 2A:
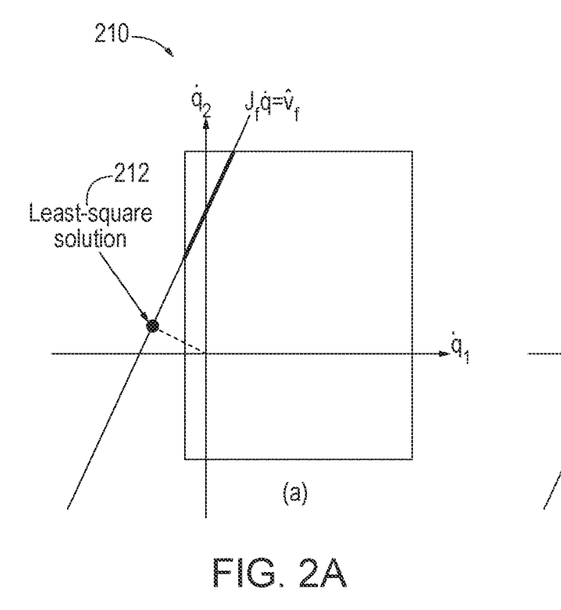
Figure 2B:
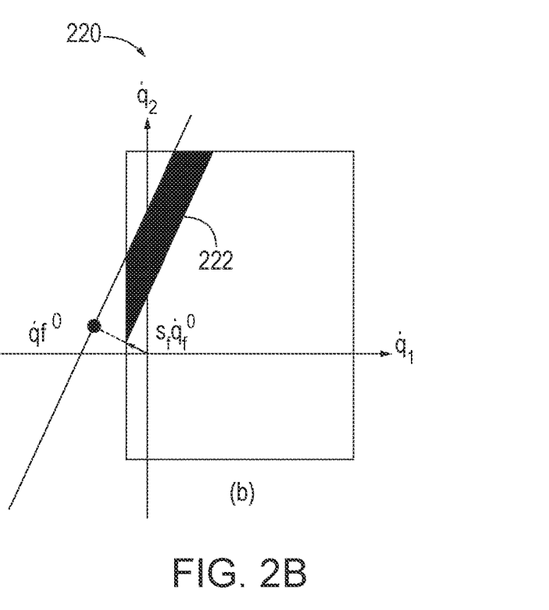

FIG. 2a is an exemplary graph 210 of a least square calculation 212 performed in association with motion optimization of the system for controlling the robot of FIG. 1, according to one aspect. Each axes may represent a different joint velocity of different joints. In FIG. 2a, a set of solutions for force optimization may be found, and among those solutions, the least square solution 212 is generally selected because it appears to be closest to the desired motion in association with motion optimization. If the least square solution 212 is directly utilized the robot may perform a motion which is unintuitive. In FIG. 2 (a), for the case of N=2 and m=1, the joint velocities that generate $v\hat{}\_f$ forms a line. When q_1≈q_(min 1) and therefore_(q'_1)≈0, the feasible solutions may be found on the portion of line segment within the rectangle, which is away from the least-square solution 212 denoted by the black dot, which may result in undesired tangential movement.

FIG. 2b is an exemplary graph 220 of a relaxation 222 of the least square calculation performed in association with motion optimization of the system for controlling the robot of FIG. 1, according to one aspect. Similarly, to FIG. 2a, the least square solution may be found. In FIG. 2b, relaxation, where the circle denotes the joint velocities that exactly realizes ω^_m. By relaxing 222 the constraints or bounds associated with force optimization, a feasible solution may be a trapezoid, rather than merely a line segment, thereby expanding the number of possible solutions for the force optimization, while relaxing the contact force parameter.

The operator motion generally calls for the robot to move in the same normal direction as force control, but opposite direction in the tangential space due to joint velocity bounds. As a result, the optimal, least-square solution 212 (black dot) incurs tangential velocity opposite to the operator motion in FIG. 2a. In contrast, the solution in FIG. 2b has no tangential motion, while degrading force control accuracy, as a compromise when force and motion control contradict one another. This solution is different from solving the force and motion control problems with single optimization using a weighted sum of both errors as the cost function because its solution always has some error in force control.

Figure 3:
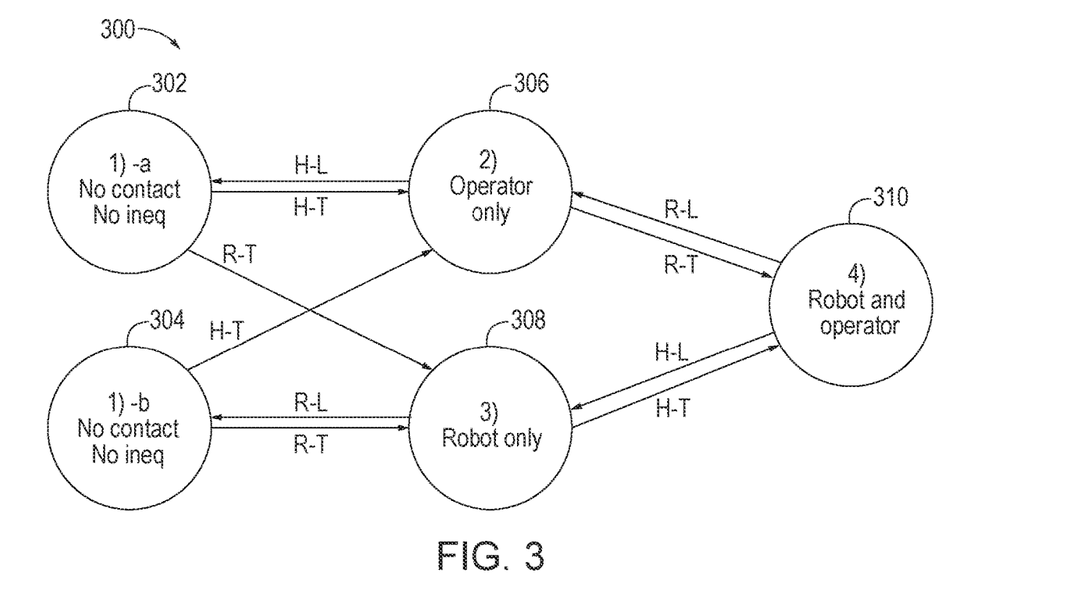
FIG. 3 is an exemplary state machine which may be implemented by the system for controlling the robot of FIG. 1, according to one aspect.

FIG. 3 is an exemplary finite state machine (FSM) 300 which may be implemented by the system for controlling the robot of FIG. 1, such as by the retargeting controller 130, according to one aspect. To facilitate the implementation of the motion retargeting controller 130, the FSM 300 shown in FIG. 3 where the state labels match the list at the beginning of this subsection except 1) is further divided into two states: 1)-a 302 without and 1)-b 304 with inequality constraint Eq. (22). As previously discussed, contact state 2) only the operator side is in contact with the object is associated with state 306, contact state 3) only the robot side is in contact with corresponding object is associated with 308, and contact state 4) both are in contact with their respective objects is associated with state 310 within the FSM 300 as implemented by the retargeting controller 130.

The controller may operate the state machine independently at each sensor pair based on the measurements from its own sensors, and perform the actions described in this subsection as shown in Table I below upon entering each state. The first two actions related to motion reference offset may be performed for all joints in the same limb when any of the sensor pairs transition between states, while the other two related to inequality constraint (22) affect only the sensor pair that changed its state.

TABLE 1

| Action | 1)-a) | 1)-b | 2) | 3) | 4) |
|---|---|---|---|---|---|
| Update ° Tj (same limb) | | | x | x | x |
| Record ° ^Rj2 (same limb) | | | | | |
| Add Eq. (22) (sensor pair) | x | | x | x | x |
| Remove Eq. (22) (sensor pair) | | | | | |

Figure 4:
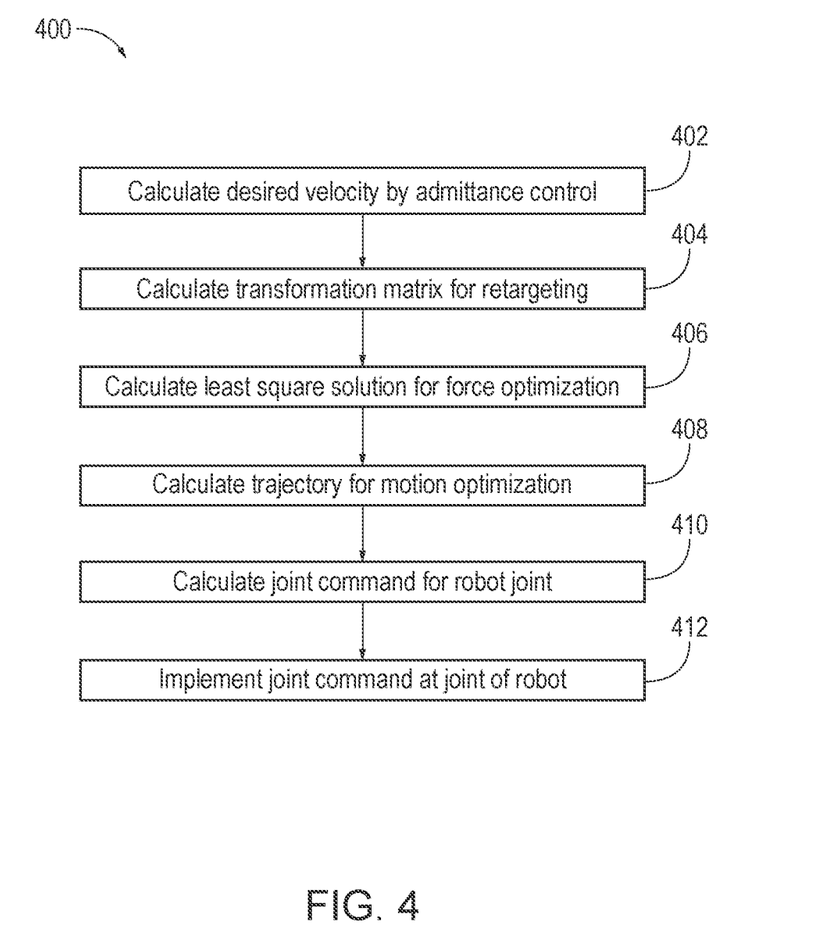
FIG. 4 is an exemplary flow diagram of a method for controlling a robot, according to one aspect.

In FIG. 3, the finite state machine used for implementing the motion retargeting, different state transitions may be defined:

R-T: the robot sensor makes a contact
R-L: the robot sensor loses contact
H-T: the operator sensor makes a contact, and
H-L: the operator sensor loses contact FIG. 4 is an exemplary flow diagram of a method 400 for controlling a robot, according to one aspect. The method 400 for controlling a robot may include calculating 402 a desired velocity $v_f$ based on an operator contact force $f_h$ and a robot contact force $f_r$, calculating 404 a transformation matrix $T_j$ which maps a human contact state to a robot contact state based on an operator pose $R_k$, a robot pose q, a robot trajectory q*, the operator contact force $f_h$, and the robot contact force $f_r$, and calculating 406 a least square solution $q_f$ to $J_f^+ \hat{v}_f$ based on the desired velocity $v_f$, $J_f^+$ may be a Moore-Penrose pseudoinverse of $J_f$, $J_f$ may be a Jacobian matrix of positions of contact points with respect to joint positions. The method 400 for controlling the robot may include calculating a scaling factor $s_f$ based on a current joint position $q_j$ of a joint of the robot, calculating a first trajectory $\dot{q}*$ based on the least square solution $q_f$, the scaling factor $s_f$, and the transformation matrix $T_j$, calculating 408 the robot trajectory q* based on the first trajectory $\dot{q}*$ in association with motion optimization, calculating 410 a joint command τ based on the robot trajectory q* and the robot pose q, and implementing 412 the joint command τ at the joint of the robot.

Figure 5:
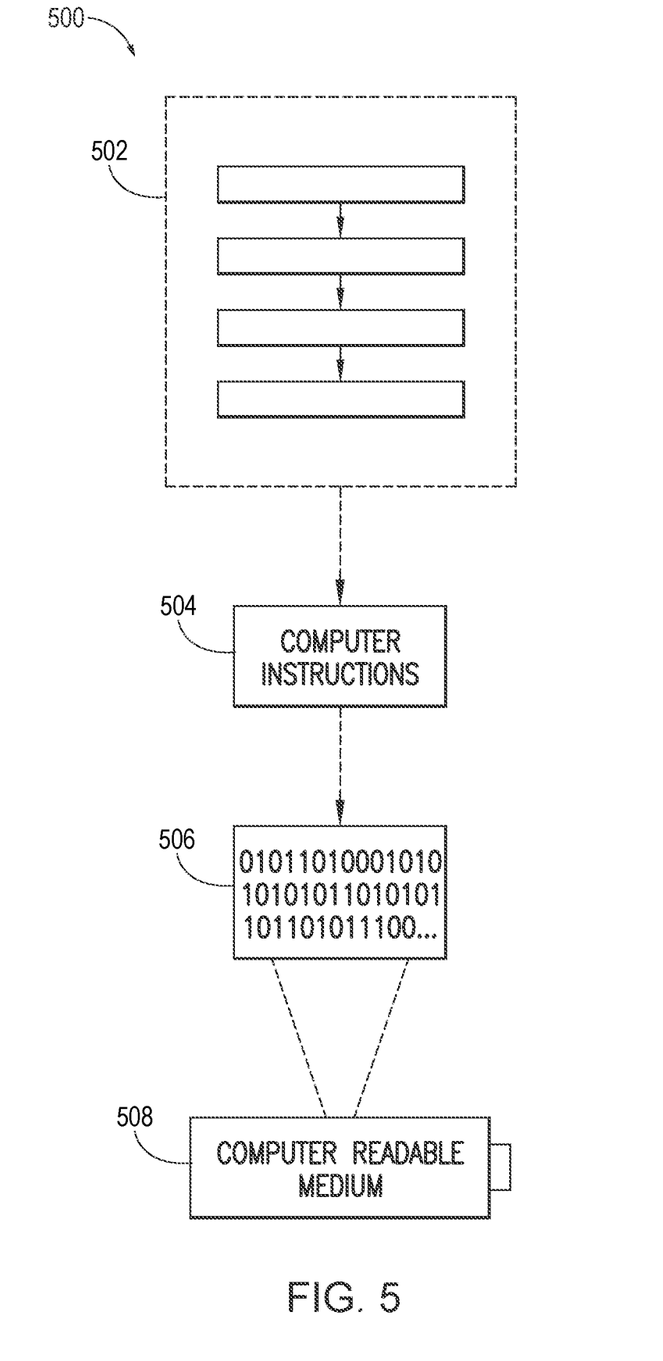
FIG. 5 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 5, wherein an implementation 500 includes a computer-readable medium 508, such as a CD-R, DVD-R, flash drive, a platter of a hard disk drive, etc., on which is encoded computer-readable data 506. This encoded computer-readable data 506, such as binary data including a plurality of zero's and one's as shown in 506, in turn includes a set of processor-executable computer instructions 504 configured to operate according to one or more of the principles set forth herein. In this implementation 500, the processor-executable computer instructions 504 may be configured to perform a method 502, such as the method 400 of FIG. 4. In another aspect, the processor-executable computer instructions 504 may be configured to implement a system, such as the system 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 6:
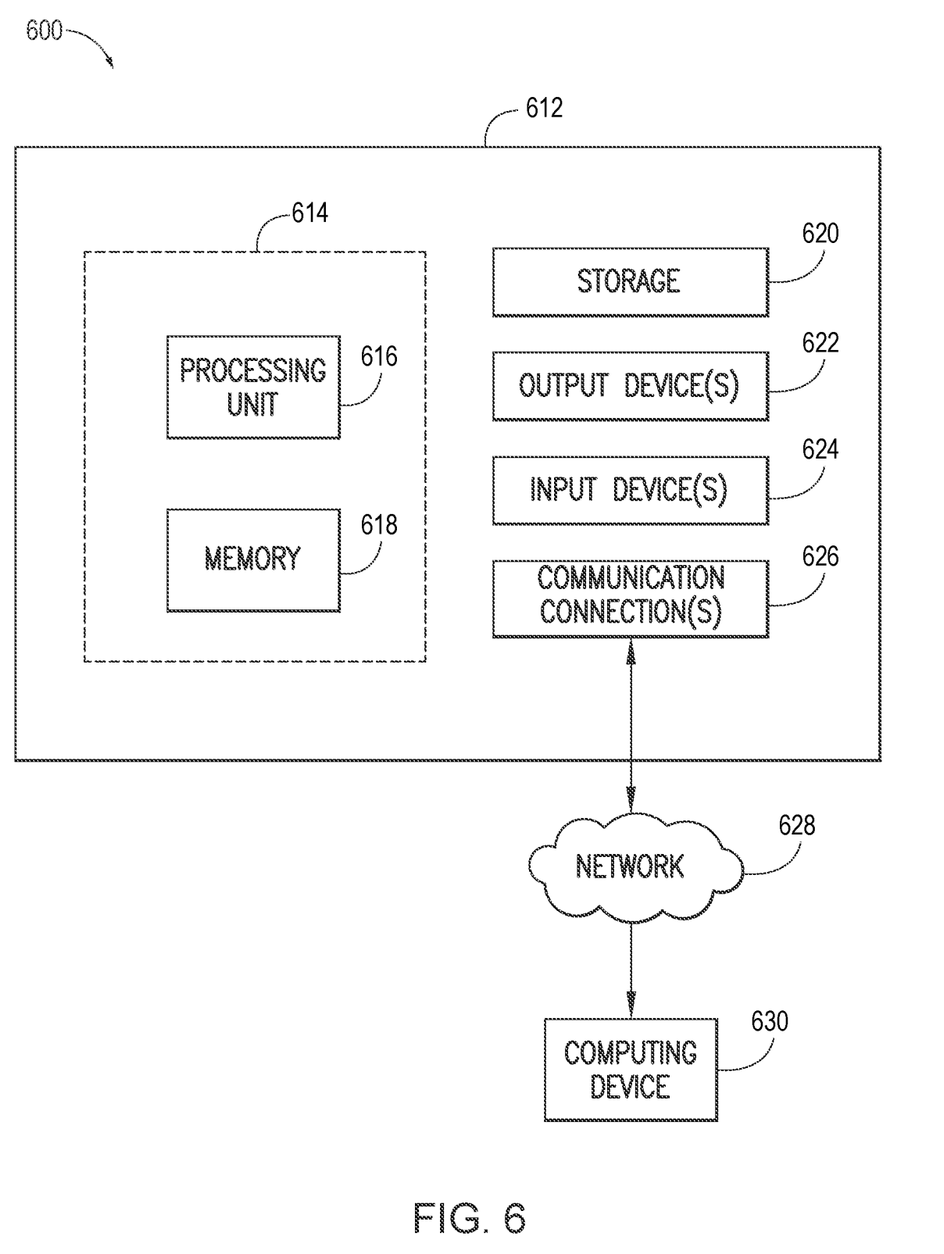
FIG. 6 is an illustration of an example computing environment where one or more of the provisions set forth herein are implemented, according to one aspect.

FIG. 6 and the following discussion provide a description of a suitable computing environment to implement aspects of one or more of the provisions set forth herein. The operating environment of FIG. 6 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 6 illustrates a system 600 including a computing device 612 configured to implement one aspect provided herein. In one configuration, the computing device 612 includes at least one processing unit 616 and memory 618. Depending on the exact configuration and type of computing device, memory 618 may be volatile, such as RAM, non-volatile, such as ROM, flash memory, etc., or a combination of the two. This configuration is illustrated in FIG. 6 by dashed line 614.

In other aspects, the computing device 612 includes additional features or functionality. For example, the computing device 612 may include additional storage such as removable storage or non-removable storage, including, but not limited to, magnetic storage, optical storage, etc. Such additional storage is illustrated in FIG. 6 by storage 620. In one aspect, computer readable instructions to implement one aspect provided herein are in storage 620. Storage 620 may store other computer readable instructions to implement an operating system, an application program, etc. Computer readable instructions may be loaded in memory 618 for execution by processing unit 616, for example.

The term "computer readable media" as used herein includes computer storage media. Computer storage media includes volatile and nonvolatile, removable and non-removable media implemented in any method or technology for storage of information such as computer readable instructions or other data. Memory 618 and storage 620 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the computing device 612. Any such computer storage media is part of the computing device 612.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The computing device 612 includes input device(s) 624 such as keyboard, mouse, pen, voice input device, touch input device, infrared cameras, video input devices, or any other input device. Output device(s) 622 such as one or more displays, speakers, printers, or any other output device may be included with the computing device 612. Input device(s) 624 and output device(s) 622 may be connected to the computing device 612 via a wired connection, wireless connection, or any combination thereof. In one aspect, an input device or an output device from another computing device may be used as input device(s) 624 or output device(s) 622 for the computing device 612. The computing device 612 may include communication connection(s) 626 to facilitate communications with one or more other devices 630, such as through network 628, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for controlling a robot, comprising:
   an admittance controller, implemented via a processor, receiving an operator contact force $f_h$ and a robot contact force $f_r$ and calculating a desired velocity $v_f$ based on the operator contact force $f_h$ and the robot contact force $f_r$;
   a retargeting controller, implemented via the processor, receiving an operator pose $R_k$, a robot pose q, a robot trajectory q*, the operator contact force $f_h$, and the robot contact force $f_r$, and calculating a transformation matrix $T_j$ which maps a human contact state to a robot contact state based on the operator pose $R_k$, the robot pose q, the robot trajectory q*, the operator contact force $f_h$, and the robot contact force $f_r$, wherein the operator pose $R_k$ is received from a sensor worn by an operator of the robot;
   a force optimization controller, implemented via the processor, receiving the desired velocity $v_f$ and calculating a least square solution $q_f$ to $J_f^+ \hat{v}_f$ based on the desired velocity $v_f$, wherein $J_f^+$ is a Moore-Penrose pseudoinverse of $J_f$, wherein $J_f$ is a Jacobian matrix of positions of contact points with respect to joint positions and calculating a maximum scaling factor $s_f$ based on a current joint position $q_j$ of a joint of the robot;
   a motion optimization controller, implemented via the processor, receiving the least square solution $q_f$, the maximum scaling factor $s_f$, and the transformation matrix $T_j$ and calculating a first trajectory $\dot{q}^*$ based on the least square solution $q_f$, the maximum scaling factor $s_f$, and the transformation matrix $T_j$, wherein the motion optimization controller relaxes the least square solution $q_f$ based on the maximum scaling factor $s_f$;
   a tracking controller, implemented via the processor, receiving the first trajectory $\dot{q}^*$ and the robot pose q, calculating the robot trajectory q* based on the first trajectory $\dot{q}^*$, and calculating a joint command τ based on the robot trajectory q* and the robot pose q; and
   a motor controller, implemented via the processor, implementing the joint command τ at the joint of the robot.

2. The system of claim 1, wherein the operator contact force $f_h$ is measured by a force sensor attached to the operator of the robot.

3. The system of claim 1, comprising a force sensor attached to the robot measuring the robot contact force $f_r$.

4. The system of claim 1, wherein the admittance controller calculates the desired velocity $v_f$ based on admittance control.

5. The system of claim 1, wherein the motion optimization controller relaxes the least square solution $q_f$ based on minimizing tangential motion.

6. The system of claim 1, wherein the retargeting controller calculates the transformation matrix $T_1$ based on motion reference offset.

7. The system of claim 1, wherein the motion optimization controller calculates the first trajectory $\dot{q}^*$ based on an inequality constraint associated with a position of a force sensor.

8. The system of claim 1, wherein the joint command z includes a joint torque for the joint of the robot.

9. The system of claim 1, wherein the tracking controller includes a proportional-derivative (PD) controller and calculates the joint command τ based on gravity compensation.

10. A method for controlling a robot, comprising:
    calculating a desired velocity $v_f$ based on an operator contact force $f_h$ and a robot contact force $f_r$;
    calculating a transformation matrix $T_j$ which maps a human contact state to a robot contact state based on an operator pose $R_k$, a robot pose q, a robot trajectory q*, the operator contact force $f_h$, and the robot contact force $f_r$;
    receiving the operator pose $R_k$ from a sensor worn by an operator of the robot;
    calculating a least square solution $q_f$ to $J_f^+ \hat{v}_f$ based on the desired velocity $v_f$, wherein $J_f^+$ is a Moore-Penrose pseudoinverse of $J_f$, wherein $J_f$ is a Jacobian matrix of positions of contact points with respect to joint positions;
    calculating a maximum scaling factor $s_f$ based on a current joint position $q_j$ of a joint of the robot;
    calculating a first trajectory $\dot{q}^*$ based on the least square solution $q_f$, the maximum scaling factor $s_f$, and the transformation matrix $T_j$;
    relaxing the least square solution $q_f$ based on the maximum scaling factor $s_f$;
    calculating the robot trajectory q* based on the first trajectory $\dot{q}^*$;
    calculating a joint command z based on the robot trajectory q* and the robot pose q; and
    implementing the joint command τ at the joint of the robot.

11. The method of claim 10, wherein the operator contact force $f_h$ is measured by a force sensor attached to the operator of the robot.

12. The method of claim 10, wherein the robot contact force $f_r$ is measured by a force sensor attached to the robot.

13. The method of claim 10, comprising calculating the desired velocity $v_f$ based on admittance control.

14. The method of claim 10, comprising relaxing the least square solution $q_j$ based on minimizing tangential motion.

15. The method of claim 10, comprising calculating the transformation matrix $T_j$ based on motion reference offset.

16. The method of claim 10, comprising calculating the first trajectory $\dot{q}^*$ based on an inequality constraint associated with a position of a force sensor.

17. The method of claim 10, comprising calculating the joint command τ based on gravity compensation.

18. A system for controlling a robot, comprising:
    a force sensor attached to the robot measuring a robot contact force $f_r$;
    an admittance controller, implemented via a processor, receiving an operator contact force $f_h$ and the robot contact force $f_r$, and calculating a desired velocity $v_f$ based on the operator contact force $f_h$ and the robot contact force $f_r$;

a retargeting controller, implemented via the processor, receiving an operator pose $R_k$, a robot pose q, a robot trajectory q*, the operator contact force $f_h$, and the robot contact force $f_r$, and calculating a transformation matrix $T_j$ which maps a human contact state to a robot contact state based on the operator pose $R_k$, the robot pose q, the robot trajectory q*, the operator contact force $f_h$, and the robot contact force $f_r$, wherein the operator pose $R_k$ is received from a sensor worn by an operator of the robot;

a force optimization controller, implemented via the processor, receiving the desired velocity $v_f$ and calculating a least square solution $q_f$ to $J_f^+ \hat{v}_f$ based on the desired velocity $v_f$, wherein $J_f^+$ is a Moore-Penrose pseudoinverse of $J_f$, wherein $J_f$ is a Jacobian matrix of positions of contact points with respect to joint positions and calculating a maximum scaling factor $s_f$ based on a current joint position $q_j$ of a joint of the robot;

a motion optimization controller, implemented via the processor, receiving the least square solution $q_f$, the maximum scaling factor $s_f$, and the transformation matrix $T_j$ and calculating a first trajectory $\dot{q}^*$ based on the least square solution $q_f$, the maximum scaling factor $s_f$, and the transformation matrix $T_j$, wherein the motion optimization controller relaxes the least square solution $q_f$ based on the maximum scaling factor $s_f$;

a tracking controller, implemented via the processor, receiving the first trajectory $\dot{q}^*$ and the robot pose q, calculating the robot trajectory q* based on the first trajectory $\dot{q}^*$, calculating a joint command τ based on the robot trajectory q* and the robot pose q; and a motor controller, implemented via the processor, implementing the joint command τ at the joint of the robot.

* * * * *